(12) United States Patent
Liu et al.

(10) Patent No.: US 11,855,299 B2
(45) Date of Patent: Dec. 26, 2023

(54) ELECTRIC ENERGY STORAGE DEVICE AND ELECTRIC TOOL SYSTEM

(71) Applicant: Globe (Jiangsu) Co., Ltd., Changzhou (CN)

(72) Inventors: Chuanjun Liu, Changzhou (CN); An Yan, Changzhou (CN)

(73) Assignee: Globe (Jiangsu) Co., Ltd., Changzhou (CN)

(*) Notice: Subject to any disclaimer, the term of this patent is extended or adjusted under 35 U.S.C. 154(b) by 197 days.

(21) Appl. No.: 17/344,940

(22) Filed: Jun. 10, 2021

(65) Prior Publication Data

US 2021/0305617 A1    Sep. 30, 2021

Related U.S. Application Data

(63) Continuation of application No. PCT/CN2019/114230, filed on Oct. 30, 2019.

(30) Foreign Application Priority Data

Dec. 20, 2018 (CN) .......................... 201811564074.2
Dec. 20, 2018 (CN) .......................... 201811564236.2

(Continued)

(51) Int. Cl.
*H01M 50/269* (2021.01)
*H01M 50/247* (2021.01)
(Continued)

(52) U.S. Cl.
CPC ............. *H01M 50/269* (2021.01); *B25F 5/00* (2013.01); *B25F 5/02* (2013.01); *B25F 5/023* (2013.01);
(Continued)

(58) Field of Classification Search
CPC .. B25F 5/023; B25F 5/00; B25F 5/02; H01M 10/0445; H01M 10/4207; H01M 10/46;
(Continued)

(56) References Cited

U.S. PATENT DOCUMENTS 3,886,426 A    5/1975  Daggett
9,634,350 B2 * 4/2017  Hwang ............... H01M 10/615
(Continued)

FOREIGN PATENT DOCUMENTS

CA    3019441 A1 *  6/2018 ............... B25F 5/00
CN    204190691 U    3/2015
(Continued)

*Primary Examiner* — M Baye Diao

(57) ABSTRACT

The disclosure provides an electric energy storage device which includes four energy units with a substantially same voltage value. Each energy unit is provided with a positive electrode and a negative electrode. The electric energy storage device comprises a socket with eight independently arranged electrode terminals that are connected with the four energy units. The disclosure also provides an electric tool system using the electric energy storage device. The electric tool is provided with plugs that may be connected with the four energy units in different states, allowing the electric energy storage device to output multiple voltages.

14 Claims, 9 Drawing Sheets

(30) Foreign Application Priority Data

| Dec. 20, 2018 | (CN) | 201811564279.0 |
|---|---|---|
| Dec. 20, 2018 | (CN) | 201811566089.2 |
| Dec. 20, 2018 | (CN) | 201822145919.6 |
| Dec. 20, 2018 | (CN) | 201822145933.6 |
| Dec. 20, 2018 | (CN) | 201822146566.1 |
| Dec. 20, 2018 | (CN) | 201822146585.4 |
| Dec. 20, 2018 | (CN) | 201822146597.7 |

(51) Int. Cl.

| H01M 50/519 | (2021.01) |
|---|---|
| H01M 50/509 | (2021.01) |
| H01M 50/204 | (2021.01) |
| B25F 5/00 | (2006.01) |
| B25F 5/02 | (2006.01) |
| H01M 10/04 | (2006.01) |
| H01M 10/42 | (2006.01) |
| H01M 10/46 | (2006.01) |
| H02J 7/00 | (2006.01) |
| H01M 50/543 | (2021.01) |
| H01R 13/05 | (2006.01) |
| H01R 13/11 | (2006.01) |
| H01M 50/50 | (2021.01) |

(52) U.S. Cl.
CPC ... *H01M 10/0445* (2013.01); *H01M 10/4207* (2013.01); *H01M 10/46* (2013.01); *H01M 50/204* (2021.01); *H01M 50/247* (2021.01); *H01M 50/50* (2021.01); *H01M 50/509* (2021.01); *H01M 50/519* (2021.01); *H01M 50/543* (2021.01); *H01R 13/05* (2013.01); *H01R 13/113* (2013.01); *H02J 7/0024* (2013.01); *H02J 7/0063* (2013.01); *H01M 2220/30* (2013.01)

(58) Field of Classification Search
CPC ............ H01M 50/509; H01M 50/269; H01M 50/204; H01M 50/247; H01M 50/50; H01M 50/519; H01M 50/543; H01M 2220/30; H01R 13/05; H01R 13/113; H02J 7/0024; H02J 7/0063; H02J 1/082; H02J 7/0045; Y02P 70/50; Y02E 60/10

USPC .......................................................... 320/114
See application file for complete search history.

(56) References Cited

U.S. PATENT DOCUMENTS

| 10,389,139 | B2* | 8/2019 | Velderman | H02J 3/36 |
|---|---|---|---|---|
| 10,439,415 | B2* | 10/2019 | Zhu | H02J 7/00712 |
| 10,784,698 | B2* | 9/2020 | Jaensch | G01R 31/382 |
| 11,205,820 | B2* | 12/2021 | Hanawa | H01M 50/296 |
| 2011/0250484 | A1 | 10/2011 | Meng | |
| 2012/0133310 | A1 | 5/2012 | Lee | |
| 2014/0002003 | A1* | 1/2014 | Kim | H02J 7/00 |
| | | | | 429/61 |
| 2016/0020443 | A1 | 1/2016 | White et al. | |
| 2016/0126533 | A1 | 5/2016 | Velderman et al. | |
| 2016/0204475 | A1 | 7/2016 | White et al. | |
| 2016/0336558 | A1 | 11/2016 | White et al. | |
| 2016/0336559 | A1 | 11/2016 | White et al. | |
| 2017/0072553 | A1 | 3/2017 | Bakker | |
| 2017/0104243 | A1 | 4/2017 | Velderman et al. | |
| 2017/0149372 | A1 | 5/2017 | White et al. | |
| 2017/0170671 | A1 | 6/2017 | Mergener et al. | |
| 2017/0222454 | A1 | 8/2017 | Bakker | |
| 2017/0338452 | A1 | 11/2017 | Varipatis et al. | |
| 2018/0076651 | A1 | 3/2018 | Cox et al. | |
| 2018/0076652 | A1 | 3/2018 | Cox et al. | |
| 2018/0076754 | A1 | 3/2018 | White et al. | |
| 2018/0262150 | A1 | 9/2018 | White et al. | |
| 2018/0262151 | A1* | 9/2018 | White | H02J 7/02 |
| 2018/0262152 | A1 | 9/2018 | White et al. | |
| 2018/0278196 | A1 | 9/2018 | White et al. | |
| 2019/0344419 | A1* | 11/2019 | Zhu | B25F 5/02 |

FOREIGN PATENT DOCUMENTS

| CN | 107078533 A | 8/2017 | | |
|---|---|---|---|---|
| CN | 107078533 A | 8/2017 | | |
| DE | 102013226247 A1 * | 6/2014 | ............ | H01F 38/14 |
| EP | 3838055 A1 * | 6/2021 | ............ | A45C 11/24 |
| EP | 3660949 B1 * | 6/2022 | ............ | B25F 5/00 |
| JP | S6424370 A | 1/1989 | | |
| WO | 2018079723 A1 | 5/2018 | | |
| WO | WO2018079722 A1 | 5/2018 | | |
| WO | WO2018079723 A1 | 5/2018 | | |
| WO | 2018098628 A1 | 6/2018 | | |
| WO | WO2018098628 A1 | 6/2018 | | |

* cited by examiner

ELECTRIC ENERGY STORAGE DEVICE AND ELECTRIC TOOL SYSTEM

CROSS REFERENCE TO RELATED APPLICATION

The present application is related to and claims the benefit of priority of the following commonly-owned, presently-pending Chinese patent applications: serial No. 201811564074.2, No. 201811564236.2, No. 201811564279.0, No. 201811566089.2, No. 201822145919.6, No. 201822145933.6, No. 201822146566.1, No. 201822146585.4, No. 201822146597.7, all filed Dec. 20, 2020, which the present application is a non-provisional application thereof. The disclosures of the forgoing applications are hereby incorporated by reference in their entirety, including any appendices or attachments thereof, for all purposes.

TECHNICAL FIELD

The disclosure relates to the field of power tools, in particular to an electric energy storage device and an electric tool system.

BACKGROUND

In the garden machinery and power tool industry, power tools are generally driven by rechargeable batteries, typically batteries consisting of a plurality of battery, and motors are driven by electrical energy stored in the batteries. After use, the voltage is reduced, the battery pack can be detached from the electric tool, and the external charging device is used for charging the battery pack.

The electric tool has a rated working voltage, different electric tools have different rated working voltages, and the output voltage of the battery pack is fixed, so that different battery packs need to be prepared to adapt to the electric tools with different rated working voltages, which the operation is complicated, the cost is increased, and the resource is wasteful.

Therefore, it is necessary to design an electric energy storage device and an electric tool system to solve the above problems.

SUMMARY

This disclosure provides an electric energy storage device which can provide three output voltages, and an electric tool system using the electric energy storage device.

To achieve the above object, the disclosure provides the following solution, an electric energy storage device which comprises four energy units with a substantially same voltage value, wherein each energy unit is provided with a positive electrode and a negative electrode, the electric energy storage device comprises a socket, and the socket comprises eight independently arranged electrode terminals; the eight electrode terminals comprise four positive terminals respectively connected with the positive poles of the four energy units and four negative terminals respectively connected with the negative poles of the four energy units.

In an embodiment, each electrode terminal is provided with a contact part formed by two arc-shaped elastic arms, and the socket comprises a communication terminal and a charging terminal.

In an embodiment, eight of the electrode terminals are evenly distributed into an upper row and a lower row, the polarities of the two electrode terminals corresponding to the upper position and the lower position are the same, and the corresponding two contact parts are vertically aligned.

In an embodiment, four electrode terminals located at two outer sides are correspondingly connected with positive electrodes and negative electrodes of two energy units respectively, and four electrode terminals located at the inner sides are correspondingly connected with positive electrodes and negative electrodes of the other two energy units respectively.

In an embodiment, the four electrode terminals in the upper row are a fourth negative terminal, a second negative terminal, a third positive terminal, and a first positive terminal, and the four electrode terminals in the lower row are a first negative terminal, a third negative terminal, a second positive terminal, and a fourth positive terminal.

In an embodiment, eight of the electrode terminals are arranged in a row and sequentially comprise a fourth negative terminal, a third negative terminal, a second negative terminal, a first negative terminal, a second positive terminal, a third positive terminal, a fourth positive terminal, and a first positive terminal.

To achieve the above object, the disclosure provides the following technical solution. An electric tool system includes an electric tool and the above electric energy storage device which is provided with a plug matched with the socket, the plug is provided with a plurality of male terminals, the plurality of male terminals are electrically connected with eight electrode terminals, and the four energy units form one of the following four connection states: a. four energy units are connected in parallel, b. each two of the four energy units are parallel connected first and then series connected therebetween, c. each two of the four energy units are series connected first and then parallel connected therebetween, and d. four energy units are connected in series.

In an embodiment, the plug includes a first male blade and a second male blade, the first male blade is connected to the four negative terminals of the four energy units, and the second male blade is connected to the four negative terminals of the four energy units.

In an embodiment, the first male blade and the second male blade are each provided with two contact arms, wherein each of the contact arms is in contact with two electrode terminals; or the first male blade and the second male blade are each provided with four contact arms; each of the contact arms is in contact with one of the electrode terminals.

In an embodiment, the plug includes a first male blade, a second male blade, and a third male blade, the first male blade is connected to the two negative terminals corresponding to two of the energy units, and the second male blade is connected to the two positive terminals corresponding to the other two energy units, and the third male blade is connected to the remaining four electrode terminals.

In an embodiment, the first male blade and the second male blade are each provided with two contact arms, and the third male blade is provided with four contact arms.

In an embodiment, the four contact arms of the third male blade are located in a row.

In an embodiment, the plug comprises a first male blade, a second male blade, a third male blade, a fourth male blade, and a fifth male blade, wherein the first male blade is connected with a negative terminal corresponding to one energy unit, the fifth male blade is connected with a positive terminal corresponding to the other energy unit, and the second male blade, the third male blade and the fourth male blade are connected with the remaining six electrode terminals in series.

In an embodiment, the first male blade and the fifth male blade are each provided with one contact arm, and the second male blade, the third male blade, and the fourth male blade each is provided with two contact arms respectively connected to different electrodes.

The disclosure also provides the following technical solution. An electric tool system includes a low-voltage electric tool, a medium-voltage electric tool, and a high-voltage electric tool. The electric tool system further comprises the above electric energy storage device, the low-voltage electric tool is provided with a low-voltage plug, the low-voltage plug cooperates with the socket and the four energy units are parallel connected; the high-voltage electric tool is provided with a high-voltage plug which cooperates with the socket and enables the four energy units are series connected; the medium-voltage electric tool is provided with a medium-voltage plug, and the medium-voltage plug cooperates with the socket and enables the four energy units are connected in a medium-voltage state to provide a medium-voltage.

The beneficial effects of the disclosure are: the electric energy storage device has a variety of output voltages, which increases the application range of the electric energy storage device and reduces the cost.

DETAILED DESCRIPTION

Figure 1:
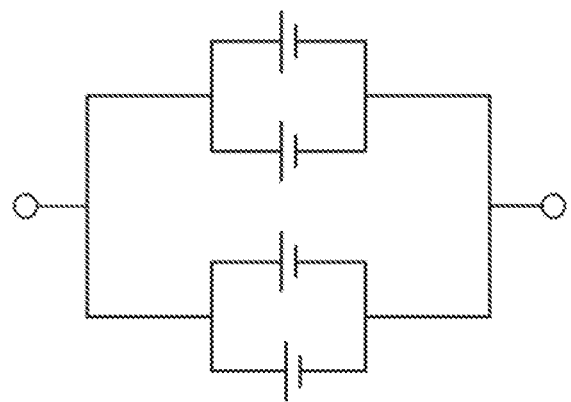
FIG. 1 is a parallel circuit diagram of four energy units of the disclosure.

In order to make objects, aspects, and advantages of the disclosure more apparent, the disclosure will describe in detail with the drawings and specific examples.

It should be noted that, in the drawings, wherein only structural and/or process steps have been shown and described in detail that are pertinent to the disclosure, other details that are not pertinent to the disclosure have been omitted so as not to obscure the disclosure with unnecessary detail.

Additionally, it should also be noted that the terms "comprises, comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

First Embodiment

Figure 2:
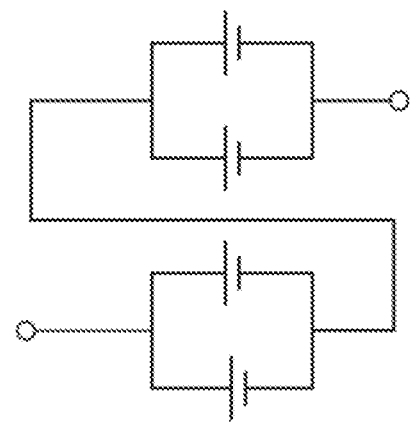
FIG. 2 is a circuit diagram showing each two of the four energy units connected in parallel and then connected in series therebetween of the disclosure.
Figure 3:
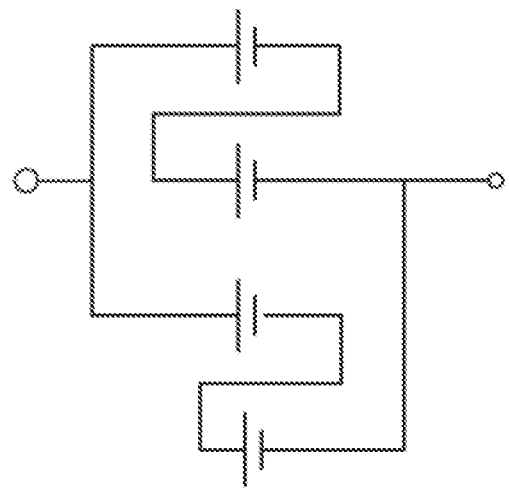
FIG. 3 is a circuit diagram showing each two of the four energy units connected in series and then connected in parallel therebetween according to the disclosure.
Figure 4:
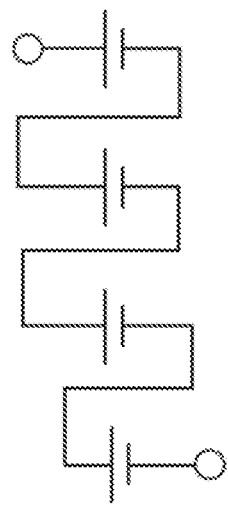
FIG. 4 is a circuit diagram of four energy units in series in the disclosure.

The disclosure provides an electric energy storage device 100 including four energy units. The voltage value of each energy unit may be substantially the same, meaning that the measured voltage value of each of the four energy units may be nV, or n±5% V. The four energy units can output three different voltages based on different configurations of series or parallel connections:

As shown in FIG. 1, all four energy units are connected in parallel, and the electric energy storage device 100 may output a low voltage of nV;

As shown in FIG. 2, the four energy units are divided into two pairs, each pair including two energy units connected in parallel, and the two pairs may then be connected in series. Alternatively, as shown in FIG. 3, the four energy units are divided into two pairs, each pair including two energy units connected in series, and the two pairs may then be connected in parallel. In the above two cases, the electric energy storage device 100 may output a medium voltage of 2*nV;

As shown in FIG. 4, when all four energy units are connected in series, the electric energy storage device 100 may output a high voltage of 4*nV.

It should be noted that each of the energy units may be a single battery or other energy carrier, or an electrical combination of multiple batteries or energy carriers; the electric energy storage device includes, but is not limited to, a lithium battery, a nickel-hydrogen battery, cadmium nickel batteries, and/or other rechargeable batteries. When a battery is used as an energy unit, the electric energy storage device 100 may also be referred to as a battery pack.

Figure 5:
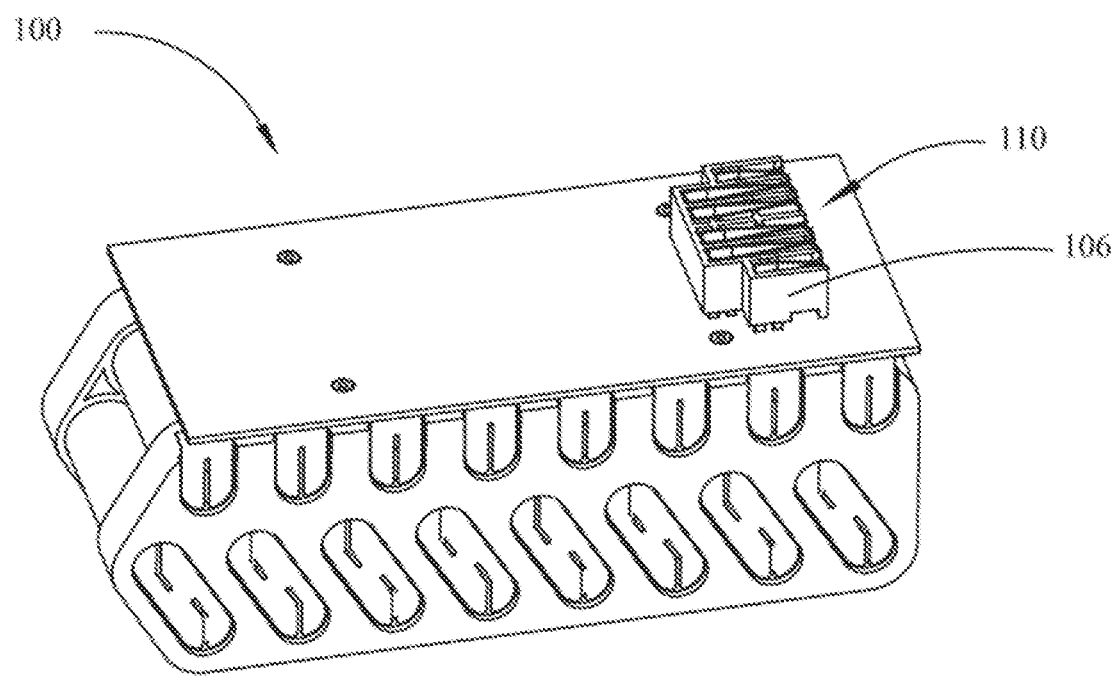
FIG. 5 is a perspective view of an electric energy storage device in accordance with the first embodiment of the disclosure.

As shown in FIG. 5, the electric energy storage device 100 may include a housing (not shown) and a socket. Four energy units may be accommodated in the housing, and the socket is electrically connected with the four energy units. The socket 110 is disposed on one side of the electric energy storage device 100, and contains a plug interface for connecting with a mating-plug of a power tool. The socket 110 comprises a body 106 and multiple conductive terminals mutually independent of each other and arranged in the body 106.

Figure 6:
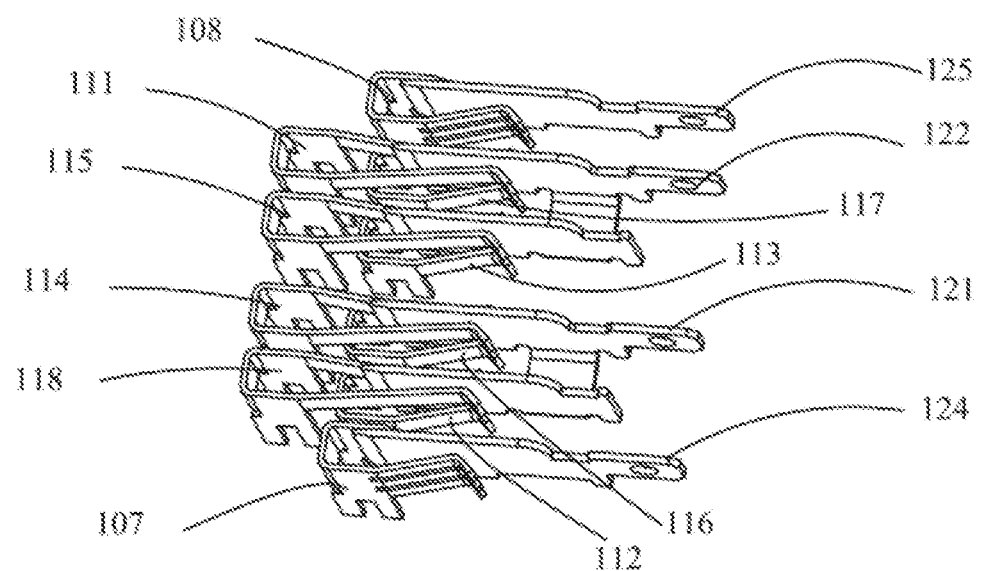
FIG. 6 is a plug-in view of a low voltage plug and a conductive terminal according to the first embodiment of the disclosure.

As shown in FIG. 6, the multiple conductive terminals comprise eight electrode terminals each of which is electrically connected to the positive or the negative electrodes of the four energy units. Specifically: the eight electrode terminals include a first positive terminal 111 and a first negative terminal 112 respectively connected to the positive and negative electrodes of the first energy unit; a second positive terminal 113 and a second negative terminal 114 respectively connected to the positive and negative electrodes of the second energy unit; a third positive terminal 115 and a third negative terminal 116 respectively connected to the positive and negative electrodes of the third energy unit; and a fourth positive terminal 117 and a fourth negative terminal 118 respectively connected to the positive and negative electrodes of the fourth energy unit.

The conductive terminals may also include a communication terminal 107 and a charging terminal 108 arranged outside the eight electrode terminals. The communication terminal 107 and the charging terminal 108 need to be separately arranged on two opposite ends of the conductive terminals, so that damage to the electric energy storage device caused by high voltage during charging can be prevented, and the service life of the electric energy storage device can be prolonged.

In this embodiment, the eight electrode terminals may be evenly distributed into two rows (an upper row and a lower row), and the communication terminal 107 and the charging terminal 108 are respectively arranged on two sides of the two rows of electrode terminals. That is, four electrode terminals located on the outer sides of the upper row and the lower row are connected with positive electrodes and negative electrodes of two energy units, the four electrode terminals located on the inner sides of the upper row and the lower row are connected with positive electrodes and negative electrodes of the other two energy units. Further, the two electrode terminals corresponding to the positive electrodes and the negative electrodes of the same energy unit are arranged in a diagonal relation. Specifically, the electrode terminals in the upper row are, from left to right, a fourth negative terminal 118, a second negative terminal 114, a third positive terminal 115, and a first positive terminal 111; the electrode terminals in the lower row are, from left to right, a first negative terminal 112, a third negative terminal 116, a second positive terminal 113, and a fourth positive terminal 117.

Each of the electrode terminals 111, 112, 113, 114, 115, 116, 117, 118 is provided with a contact part. The contact part comprises two arc-shaped elastic arms which protrude oppositely, and a vertical plugging gap is formed between the two elastic arms, in which a male blade of a connecting plug may be inserted. The polarity of the two electrode terminals corresponding to the positions in the upper row and the lower row may be the same, and the two contact parts are vertically aligned and can be contacted with the same connecting-plug male blade. For example, the fourth negative terminal 118 located at the first position of the upper left row may aligned with the contact part of the first negative terminal 112 located at the first position of the lower left row, and so on.

The electric energy storage device 100 of the disclosure is capable of providing energy to a plurality of power tools having different rated voltages, each of the power tools having a corresponding plug that interfaces with a receptacle 110 of the electric energy storage device 100. The plug may include an insulating base (not shown) and a plurality of male blades mounted on the insulating base (not shown). Different electric tools are provided with different plugs, and different plugs may be provided with male blades in different arrangement states, in order to generate different connection states with the eight electrode terminals of the socket, so that different connection states are formed among the four energy units to form different output voltages. Each of the plugs further includes a communication male blade coupled with the communication terminal 107, and a charging male blade coupled with the charging terminal 108. The communication male blade and the charging male blade may not participate in voltage output, so no additional details are disclosed.

FIG. 6 shows a situation in which the socket 110 of the electric energy storage device 100 can be configured to insert a low-voltage plug 120 (shown in FIG. 7) of a low-voltage electric tool.

Figure 7:
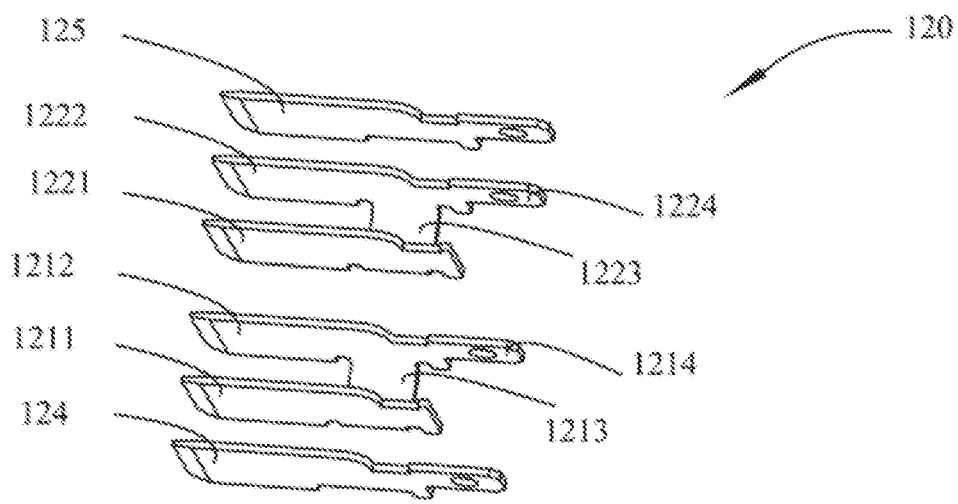
FIG. 7 is a block diagram of the low voltage plug of FIG. 6.

As shown in FIG. 7, the low-voltage plug 120 includes a communication male blade 124 and a charging male blade 125 located at the two outermost sides, in order to be mated respectively with the communication terminal 107 and the charging terminal 108. The low-voltage plug 120 further includes two independently disposed low-voltage male blades 121 and 122. Specifically, the male blade 121 may include two oppositely disposed contact arms 1211, 1212, a connection portion 1213 connects the two contact arms 1211 and 1212, and a voltage output portion 1214 may be connected to the contact arm 1211 and the contact arm 1212. The two low-voltage male blades 121 and 122 have a similar structure. Taking the low-voltage male blade 121 as an example, the contact arms 1211 and 1212 are located at the front end, and the voltage output part 1214 are respectively located at the rear end, of the low-voltage male blade 121. The contact arms 1211 and 1212 and the voltage output part 1214 are vertically arranged, and the voltage output part 1214 and one of the contact arms 1211 and 1212 are located in the same vertical plane. The connection portion 1213 may horizontally connect the bottom edges of the two contact arms 1211, 1212 near one side of the voltage output portion 1214 at the middle section of the low-voltage male blade 121.

Referring back to FIG. 6, when the socket 110 is mated with the low-voltage plug 120, each of the contact arms 1211 and 1212 (of the low-voltage male blades 121 and 122) may be connected to a corresponding contact portion of two electrode terminals, which are up-down aligned. Specifically, the contact arm 1211 of the low voltage male blade 121 may be plugged into the fourth negative terminal 118 and the first negative terminal 112, and simultaneously the contact arm 1212 may be plugged into the second negative terminal 114 and the third negative terminal 116. That is, the low voltage male blade 121 connects the negative electrodes of the four energy units together.

The contact arm 1221 of the low voltage male blade 122 may be plugged into the third positive terminal 115 and the second positive terminal 113, and simultaneously the contact arm 1222 may be plugged into the first positive terminal 111 and the fourth positive terminal 118. That is, the low voltage male blade 122 connects the positive electrodes of the four energy units together. Thus, the low-voltage male blade 121 and the low-voltage male blade 122 may connect four energy units in parallel, and as shown in FIG. 1, and the electric energy storage device 100 may output through two voltage outputs 1214, 1224 a low voltage of nV for the low-voltage power tool.

Figure 8:
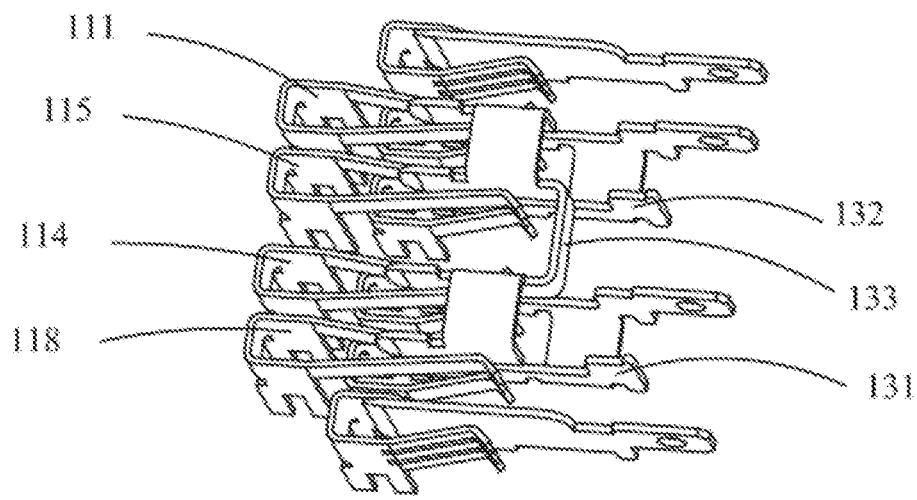
FIG. 8 is a plug-in view of a medium voltage plug and a conductive terminal according to the first embodiment of the disclosure.

FIG. 8 shows a situation in which the socket 110 of the electric energy storage device 100 can be configured to insert a medium voltage plug 130 (shown in FIG. 9) of a medium voltage electric tool.

Figure 9:
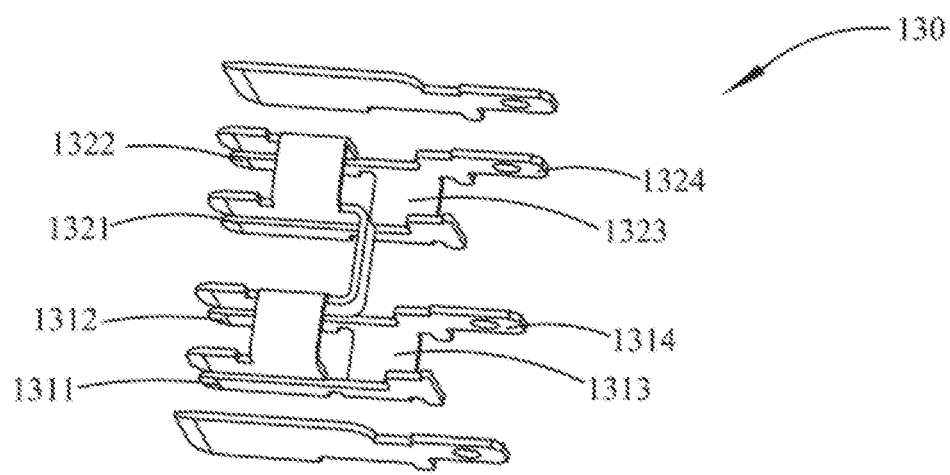
FIG. 9 is a structural view of the medium voltage plug of FIG. 8.

As shown in FIG. 9, the medium voltage plug 130 includes a communication male blade (not labeled) and a charging male blade (not labeled) located on the two outermost sides, in order to respectively be mated and plugged into the communication terminal 107 and the charging terminal 108. The medium voltage plug 130 includes three independently set medium voltage male blades 131, 132, 133. The three medium voltage male blades 131, 132, 133 may be installed on an insulating base (not shown). The medium voltage male blade 131 may include two contact arms 1311, 1312, a connection portion 1313 connecting the two contact arms 1311, 1312, and a voltage output portion 1314 connected with the contact arms 1311 and 1312. The medium voltage male blade 132 may include two contact arms 1321, 1322 opposite to each other, a connection portion 1323 connecting the two contact arms 1321, 1322, and a voltage output portion 1324 connected to the contact arms 1321 and 1322. The two medium-voltage male blades 131, 132 are arranged side by side.

Figure 10:
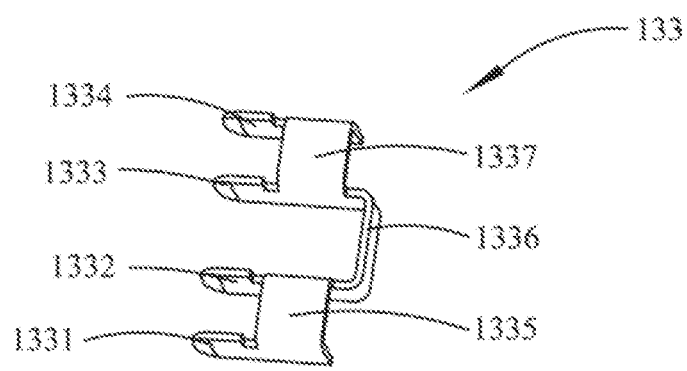
FIG. 10 is a block diagram of one of the medium voltage male blades of FIG. 9.

The structure of the medium-voltage male blades 131, 132 may be substantially the same as that of the low-voltage male blades 121, 122 of the low-voltage plug, except that the vertical height may be relatively low. That is, the male blades 131 and 132 may be connected to the four electrode terminals in the lower row of the socket 110. As shown in FIG. 10, the medium-voltage male blade 133 includes four contact arms 1331, 1332, 1333, 1334 arranged side by side, and three connection portions 1335, 1336, 1337 connecting the adjacent contact arms 1331, 1332, 1333, 1334 in pairs. The medium voltage male blade 133 are provided above the two medium voltage male blades 131, 132 for connection with the four electrode terminals in the upper row of the socket 110.

Returning to FIG. 8, when the socket 110 is mated with the medium voltage plug 130, the contact arms 1311, 1312 of the medium voltage male blade 131 mate respectively with the first and third negative terminals 112 and 116 which are in the lower row. The contact arms 1321, 1322 of the medium voltage male blade 132 are respectively plugged into the second positive terminal 113 and the fourth positive terminal 117 located in the lower row. That is, the medium voltage male blade 131 connects two negative electrodes of the first and third energy units in parallel, and the medium voltage male blade 132 connects two positive electrodes of the second and fourth energy units in parallel.

The contact arms 1331, 1332, 1333, 1334 of the medium voltage male blade 133 are plugged into four electrode terminals located in the upper row. Specifically, the contact arms 1331, 1332 and the connection piece 1335 connect the fourth negative terminal 118 and the second negative terminal 114 of the second group in parallel, and the contact arms 1333, 1334 and the connection piece 1337 connect the third positive terminal 115 and the first positive terminal 111 in parallel. In combination with the connection of the two preceding medium voltage male blades 131, 132 to the lower electrode terminals, the first and third energy units are already in parallel, and the second and fourth energy units are already in parallel. Finally, the first and third energy units (which are connected in parallel) and the second and fourth energy units (which are connected in parallel) are connected in series through the connection piece 1336 of the medium-voltage male blade 133, so that each two of the four energy units are connected in parallel and then connected in series therebetween, as shown in FIG. 2, the electric energy storage device 100 may output through the two voltage output parts 1314, 1324 a medium voltage of 2*nV for the medium-voltage power tool.

It can be seen in different embodiments, that the plug can be configured as a combination of male blades in various forms, such that when the plug is mated with the socket 110, each two of the four energy units are connected in series and then connected in parallel therebetween to output a voltage of 2*nV. Similarly, as shown in FIG. 3, the energy units of FIG. 3 can be viewed respectively from top to bottom as first, third, second, and fourth units. The connection is compared with the connection according to the connection state in FIG. 3, which will not be described in detail herein.

Figure 11:
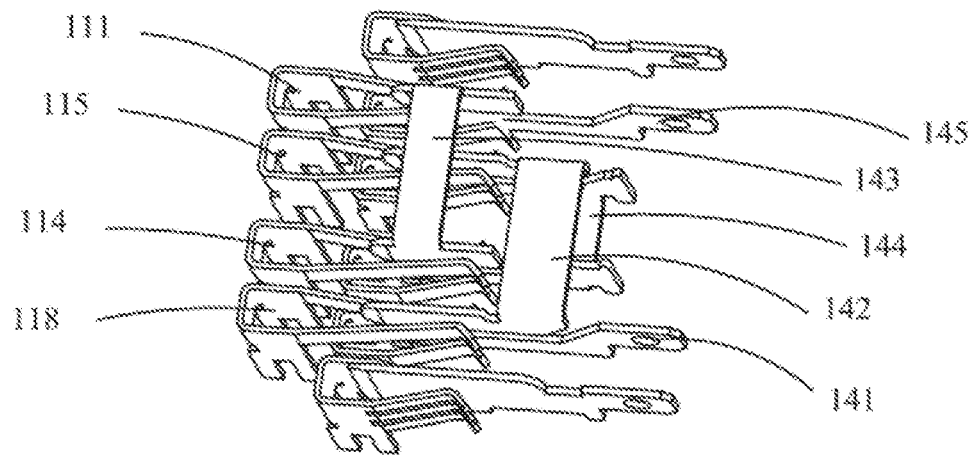
FIG. 11 is a plug-in view of a high voltage plug and a conductive terminal according to the first embodiment of the disclosure.

FIG. 11 shows a situation in which the socket 110 of the electric energy storage device 100 can be configured to insert a high-voltage plug 140 (shown in FIG. 12) of a high-voltage electric tool.

Figure 12:
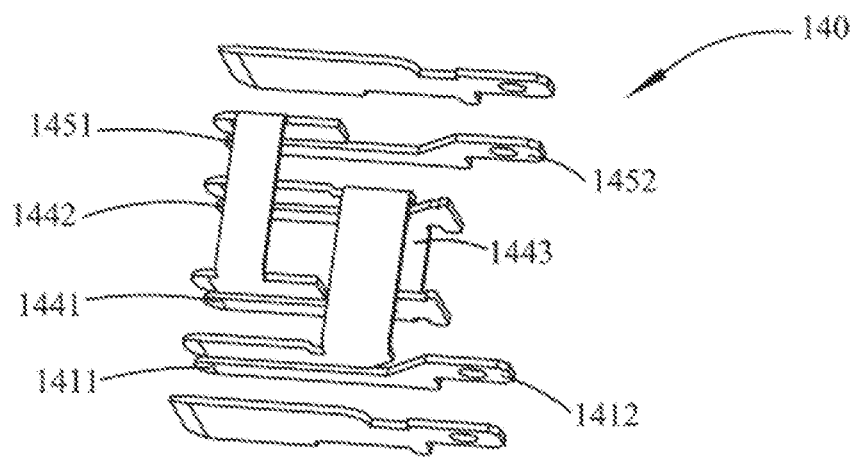
FIG. 12 is a structural view of the high voltage plug of FIG. 11.

As shown in FIG. 12, the high-voltage plug 140 includes a communication male blade (not numbered) and a charging male blade (not numbered) which are located at the two outermost sides, in order to respectively be matched and plugged with the communication terminal 107 and the charging terminal 108. The high voltage plug 140 includes five independently disposed high voltage male blades 141, 142, 143, 144, 145 mounted on a base (not shown). The high voltage male blades 142, 143 are located in the upper row, the high voltage male blades 141, 144, 145 are located in the lower row, and the high voltage male blade 144 is located between the high voltage male blades 141, 145.

Figure 13:
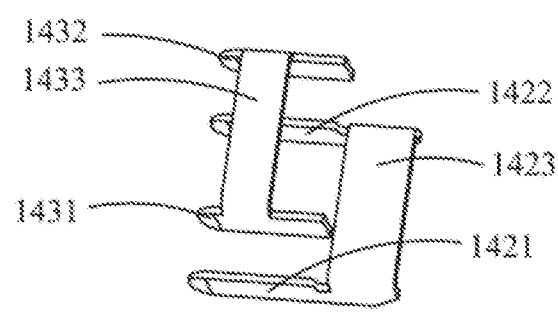
FIG. 13 is a block diagram of two of the high voltage male blades of FIG. 12.

As shown in conjunction with FIG. 12 and FIG. 13, the high-voltage male blade 141 includes a contact arm 1411 to which the first negative terminal 112 is inserted, and a voltage output portion 1412 is connected to the contact arm 1411. The high-voltage male blade 145 includes a contact arm 1451 and a voltage output part 1452 connected with the contact arm 1451, and the contact arm 1451 is in contact with the fourth positive terminal 117.

The high voltage male blade 142 includes two oppositely disposed contact arms 1421, 1422, and includes a connection portion 1423 connecting the contact arms 1421, 1422. The high voltage male blade 143 includes two oppositely disposed contact arms 1431, 1432, and includes a connection portion 1433 connecting the contact arms 1431, 1432. The high voltage male blade 144 includes two oppositely disposed contact arms 1441, 144, and includes a connection portion 1443 connecting the contact arms 1441, 1442. Contact arm 1421 is positioned directly above contact arm 1411, contact arm 1422 is positioned directly above contact arm 1442, contact arm 1431 is positioned directly above contact arm 1441, and contact arm 1432 is positioned directly above contact arm 1451.

Returning to FIG. 11, when the socket 110 is paired with the high voltage plug 140, the contact arm 1411 of the high voltage male blade 141 is in connection with the first negative terminal 112; the contact arm 1451 of the high voltage male blade 145 is in connection with the fourth positive terminal 117. The contact arms 1421, 1422 of the high voltage male blade 142 are respectively connected with the fourth negative terminal 118 and the third positive terminal 115. That is, the positive electrode of the third energy unit and the negative electrode of the fourth energy unit are connected in series. The contact arms 1431, 1432 of the high-voltage male blade 143 are respectively connected with the second negative terminal 114 and the first positive terminal 111. That is, the positive electrode of the first energy unit and the negative electrode of the second energy unit are connected in series.

The contact arms 1441, 1442 of the high voltage male blade 144 are respectively connected with the third negative terminal 116 and the second positive terminal 113. That is, the positive electrode of the second energy unit and the negative electrode of the third energy unit are connected in series. The high voltage male blades 142, 143 and 144 connect four energy units in series. As shown in FIG. 4, the electric energy storage device 100 outputs a voltage of 4*nV to the high voltage power tool through two voltage outputs 1412, 1452.

Second Embodiment

Figure 14:
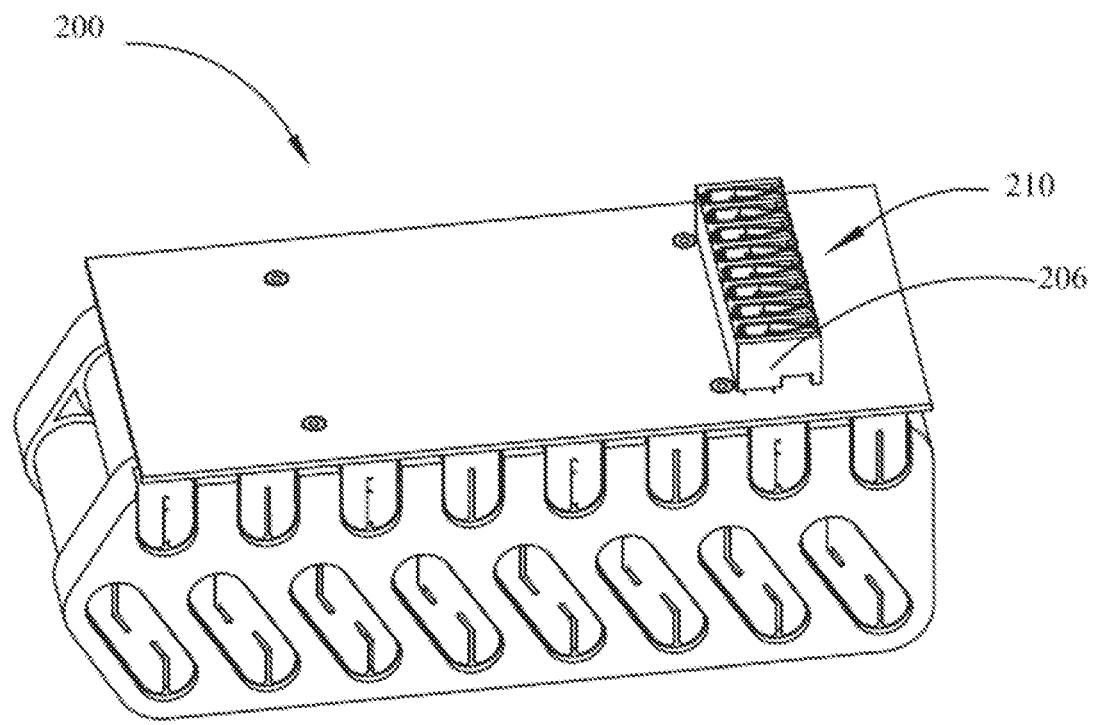
FIG. 14 is a perspective view of an electric energy storage device according to the second embodiment of the disclosure.

As shown in FIG. 14, which is another embodiment of the electric energy storage device, it differs from the electric energy storage device 100 of the first embodiment in the arrangement of the conductive terminals.

The electric energy storage device 200 includes a housing (not shown), four energy units housed within the housing, and a socket 210 electrically connected to the four energy units. As shown in conjunction with FIG. 15, the socket 210 includes a body 206 and multiple independently arranged conductive terminals housed in the body 206. The multiple conductive terminals may include eight electrode terminals electrically connected to positive and negative electrodes of four energy units. Specifically, a first positive terminal 211 and a first negative terminal may be connected to positive and negative electrodes of a first energy unit 212, a second positive terminal 213 and a second negative terminal 214 may be connected to the positive and negative electrodes of the second energy unit, a third positive terminal 215 and a third negative terminal 216 may be connected to the positive and negative electrodes of the third energy unit, and a fourth positive terminal 217 and a fourth negative terminal 218 may be connected to the positive and negative electrodes of the fourth energy unit. The multiple conductive terminals may further include a communication terminal and a charging terminal (not shown) in addition to the eight electrode terminals.

In this embodiment, the eight electrode terminals may be arranged in a line, from left to right, as the fourth negative terminal 218, the third negative terminal 216, the second negative terminal 214, the first negative terminal 212, the second positive terminal 213, the third positive terminal 215, the fourth positive terminal 217, and the first positive terminal 211. The contact portion of each electrode terminal is substantially the same as the contact portion referred to in the first embodiment.

The electric energy storage device 200 of the disclosure is also capable of supplying energy to various power tools having different rated voltages, each power tool being provided with a plug which interfaces with the same socket 210 of the electric energy storage device 200. The different plugging configurations may use different connection states established among the eight electrode terminals of the socket 210. Specifically, the different connection states are formed among the four battery packs to generate different output voltages, which can be seen with reference to FIGS. 1 to 4. Each plug comprises a communication male blade (not shown) matched and plugged with the communication terminal, and a charging male blade (not shown) matched and plugged with the charging terminal, which is for voltage input.

Figure 15:
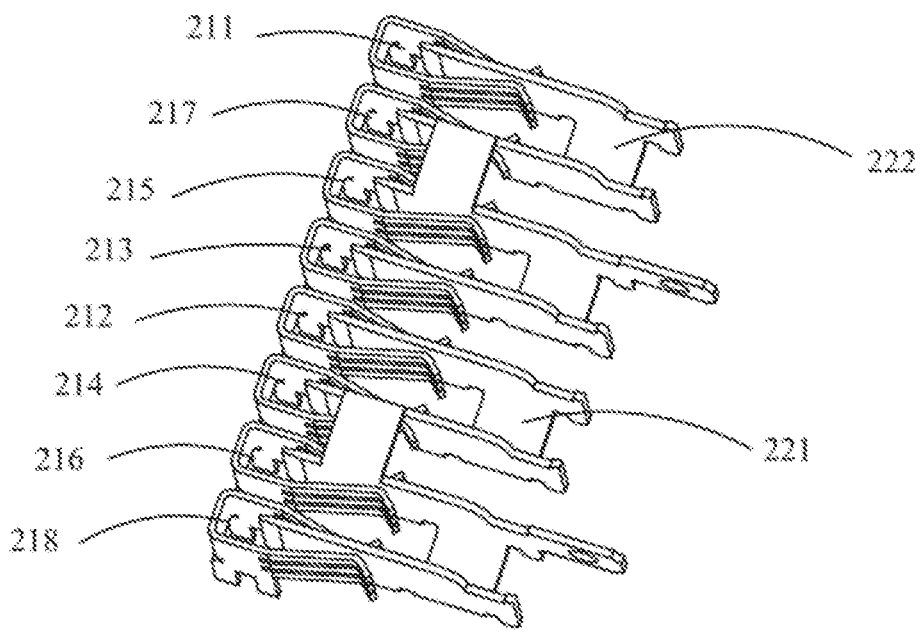
FIG. 15 is a plug-in view of a low-voltage plug and a conductive terminal according to the second embodiment of the disclosure.

FIG. 15 shows a situation where the conductive terminals of the socket 210 of the electric energy storage device 200 are matched with the low-voltage male blade of the low-voltage plug 220 of a low-voltage electric tool.

Figure 16:
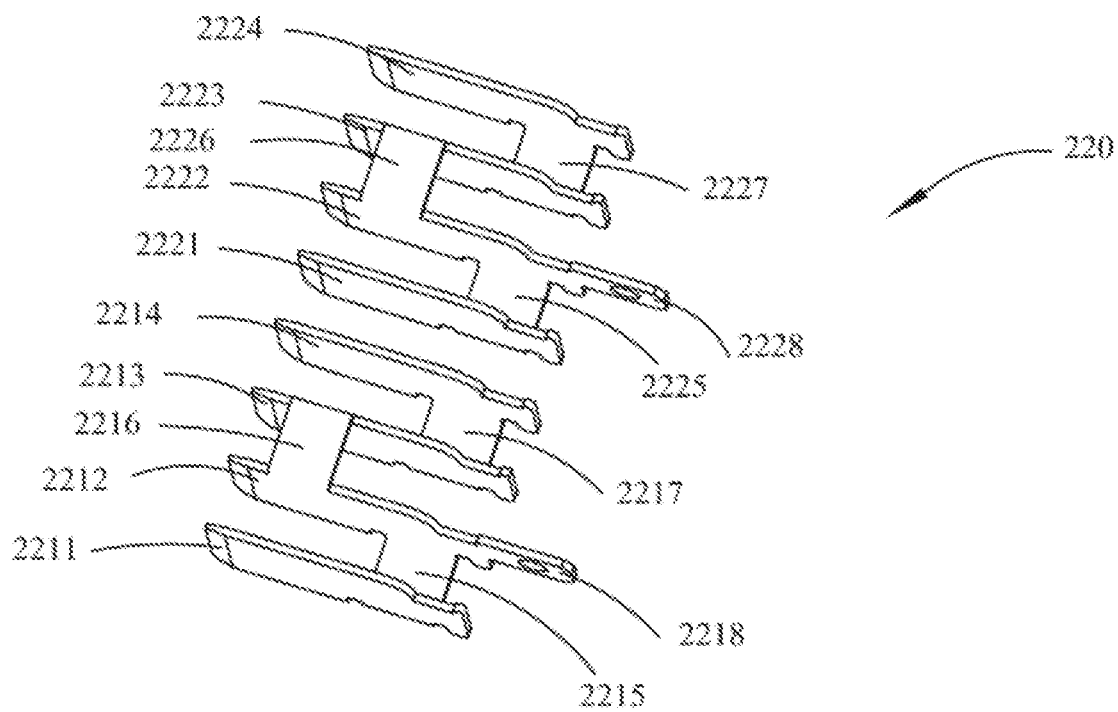
FIG. 16 is a block diagram of the low voltage plug of FIG. 15.

Referring to FIG. 16, the low-voltage plug 220 includes two independently disposed low-voltage male blades 221, 222 mounted on an insulating base (not shown). The low-voltage male blade 221 includes four contact arms 2211, 2212, 2213, 2214 arranged side by side, three connection portions 2215, 2216, 2217 each connecting two of the adjacent contact arms, and a voltage output part 2218 connecting with the contact arms 2211, 2212, 2213, 2214. The voltage output part 2218 is arranged on the rear side of the low-voltage male blade 221 and can be connected with one of the contact arms 2211, 2212, 2213, 2214 lies in the same vertical plane. The low-voltage male blade 222 includes four contact arms 2221, 2222, 2223, 2224 arranged side by side, three connection portions 2225, 2226, 2227 each connecting two of the adjacent contact arms, and a voltage output portion 2228 connecting to the contact arms 2221, 2222, 2223, 2224. The low-voltage male blade 222 may have a similar structure as the low-voltage male blade 221.

Referring back to FIG. 15, when the socket 210 is mated with the low-voltage plug 220, the contact arms 2211, 2212, 2213, 2214 of the low-voltage male blade 221 are sequentially in connection with the fourth negative terminal 218, the third negative terminal 216, the second negative terminal 214, and the first negative terminal 212. That is, the contact arms 2211, 2212, 2213, 2214 are connected in parallel with the negative electrodes of the four energy units. The contact arms 2221, 2222, 2223, 2224 of the low-voltage male blade 222 are sequentially in connection with the second positive terminal 213, the third positive terminal 215, the fourth positive terminal 217, and the first positive terminal 211. That is, contact arms 2221, 2222, 2223, 2224 are connected in parallel with the positive electrodes of the four energy units. Thus, two low-voltage male blades 221, 222 are coupled in parallel to four energy units, and as shown in FIG. 1, the electric energy storage device 200 may outputs an nV voltage for the low-voltage power tool through two voltage outputs 2218, 2228.

Figure 17:
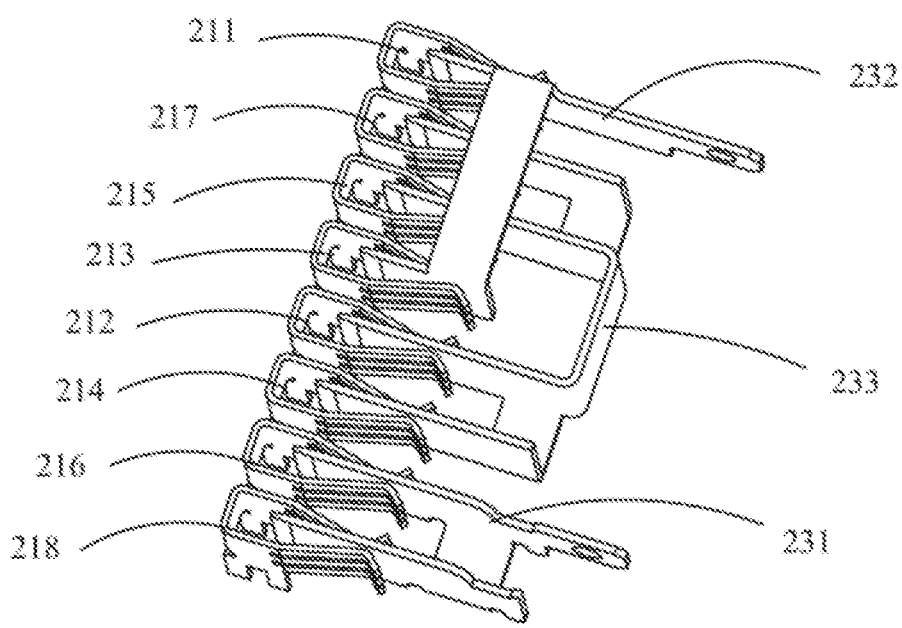
FIG. 17 is a plug-in view of a medium voltage plug and a conductive terminal according to the second embodiment of the disclosure.

FIG. 17 shows a situation in which the conductive terminals of the socket 210 of the electric energy storage device 200 are matched with the medium voltage male blades of the medium voltage plug 230 of a medium voltage electric tool.

Figure 18:
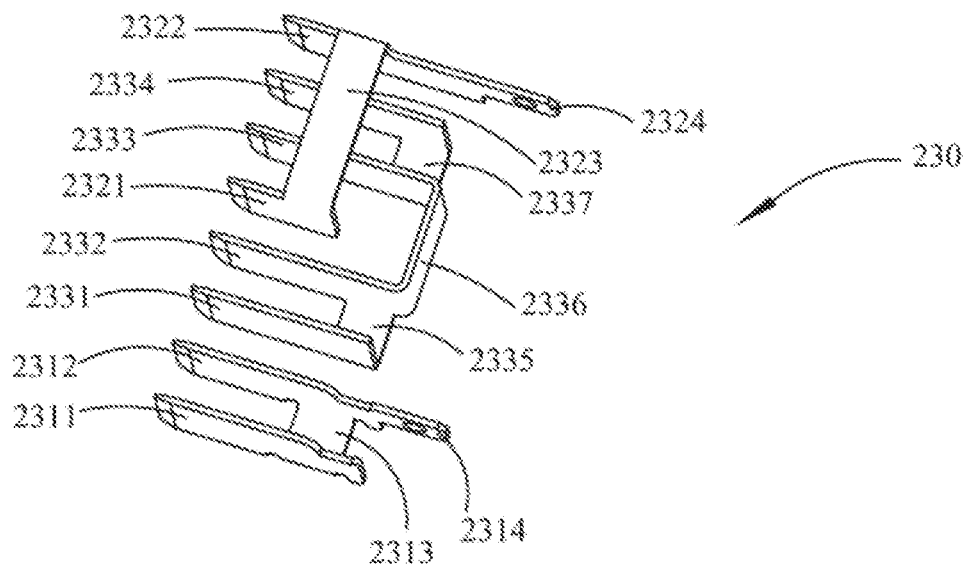
FIG. 18 is a structural view of the medium voltage plug of FIG. 17.

As shown in connection with FIG. 18, the medium voltage plug 230 includes three independently arranged medium voltage male blades 231, 232, 233 positioned side by side, with the medium voltage male blades 231, 232, 233 being mounted on a base (not shown). The medium voltage male blade 231 includes two oppositely disposed contact arms 2311, 2312, a connection portion 2313 connecting the contact arms 2311, 2312, and a voltage output portion 2314 connecting to the contact arms 2311, 2312. The medium-voltage male blade 232 includes two oppositely arranged contact arms 2321 and 2322, a connection portion 2323 connecting the contact arms 2321 and 2322 and a voltage output part 2324 connecting with the contact arms 2321 and 2322. The medium-voltage male blade 233 includes four contact arms 2331, 2332, 2333, 2334 arranged side by side, and three connection portions 2335, 2336, 2337 each connecting two adjacent contact arms.

Returning to FIG. 17, when the socket 210 is mated with the medium voltage plug 230, the two contact arms 2311, 2312 of the medium voltage male blade 231 are mated respectively with the fourth negative terminal 218 and the third negative terminal 216. The two contact arms 2321, 2322 of the medium voltage male blade 232 are respectively plugged with the second positive terminal 213 and the first positive terminal 211. The four contact arms 2331, 2332, 2333, 2334 of the medium voltage male blade 233 are sequentially plugged with the second negative terminal 214, the first negative terminal 212, the third positive terminal 215, and the fourth positive terminal 217. Thus, the first and second energy units are connected in parallel, and the third and fourth energy units are first connected in parallel and then connected in series with the first and second energy units (which are connected in parallel). As shown in FIG. 2, the electric energy storage device 200 outputs a voltage of 2*nV to the medium voltage power tool through the two voltage outputs 2314, 2324.

It can be seen in other embodiments, the plug may be provided as a combination of other types of male blades so that when the plug is mated with the socket 210, each two of the four energy units are connected in series and then connected in parallel therebetween to output a voltage of 2*nV, which will not be described in detail herein.

Figure 19:
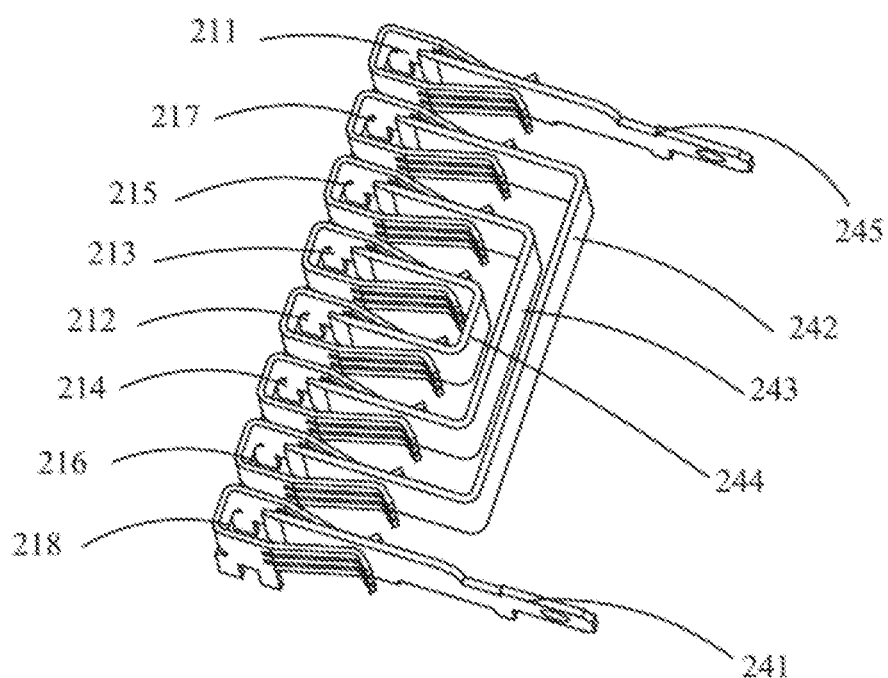
FIG. 19 is a plug-in view of a high voltage plug and a conductive terminal.

FIG. 19 shows a situation where the conductive terminals of the socket 210 of the electric energy storage device 200 are matched with the high-voltage male blades of the high-voltage plug 330 of a high-voltage electric tool.

Figure 20:
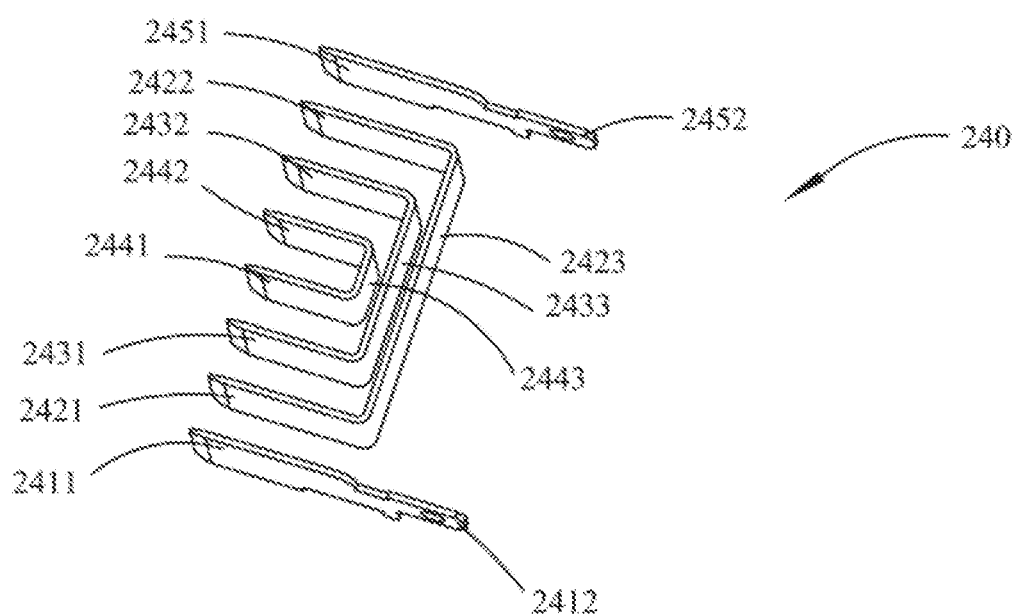
FIG. 20 is a structural view of the high voltage plug of FIG. 19.

As shown in connection with FIG. 20, the high voltage plug 240 includes five independently disposed high voltage male blades 241, 242, 243, 244, 245 mounted on a base (not shown). Here, the high-voltage male blade 241 includes a contact arm 2411 and a voltage output portion 2412 connected to the contact arm 2411. The high voltage male blade 245 includes a contact arm 2451 and a voltage output 2452 connected to the contact arm 2451. The high voltage male blade 242 includes two contact arms 2421, 2422 and a connection portion 2423 connecting the two contact arms 2421, 2422. The high-voltage male blade 243 includes two contact arms 2431, 2432 and a connection portion 2433 connecting the contact arms 2431, 2432. The high voltage male blade 244 includes two contact arms 2441, 2442 and a connection portion 2443 connecting the contact arms 2441, 2442.

Returning to FIG. 19, when the socket 210 is mated with the high voltage plug 240, the contact arm 2411 of the high voltage male blade 241 is mated with the fourth negative terminal 218, the contact arm 2451 of the high voltage male blade 245 is mated with the first positive terminal 211, and the contact arms 2421, 2422 of the high voltage male blade 242 are mated with the fourth positive terminal 217 and the third negative terminal 216 respectively, so that the third and fourth energy units are connected in series. The contact arms 2431 and 2432 of the high-voltage male blade 243 are respectively plugged with the third positive terminal 215 and the second negative terminal 214, so that the third and second energy units are connected in series. The contact arms 2441 and 2442 of the high-voltage male blade 244 are respectively plugged with the second positive terminal 213 and the first negative terminal 212, so that the second and first energy units are connected in series. That is, the high-voltage male blades 241, 242, 243 are connected in series with four energy units, the contact arm 2411 of the high-voltage male blade 241 is inserted into the fourth negative terminal 218, and the contact arm 2451 of the high-voltage male blade 245 is inserted into the first positive terminal 211. As shown in FIG. 19, the electric energy storage device 100 outputs a voltage of 4*nV to the high-voltage power tool through the two voltage output portions 2412, 2452.

In summary, four energy units with substantially the same voltage are respectively matched and plugged with a low-voltage plug, a medium-voltage plug, and a high-voltage plug through electrode terminals. Specifically, the four energy units may be mutually connected in parallel to output a low voltage; each two of the four energy units may be parallel connected first and then series connected therebetween or each two of the four energy units may be series connected first and then parallel connected therebetween to output a medium voltage, or the four energy units may be mutually connected in series to output a high voltage. Therefore, the same electric energy storage device can selectively supply power to three electric tools with different rated working voltages. Such an operation is simple and convenient, and the cost is reduced.

Therefore, although the disclosure has been described herein with reference to specific embodiments, freedom of modification, various changes and substitutions are intended to be included in the above disclosure, and it should be understood that, in some cases, on the premise of being without departing from the scope and sprit of the proposed disclosure, some features of the disclosure will be adopted without corresponding use of other features. Therefore, many modifications can be made to adapt specific environments or materials to the essential scope and spirit of the disclosure. The disclosure is not intended to be limited to specific terms used in the following claims and/or specific embodiments disclosed as best ways to implement the disclosure, but the disclosure will include any and all embodiments and equivalents falling within the scope of the appended claims. Therefore, the scope of the disclosure will only be determined by the appended claims.

What is claimed is:

1. An electric energy storage device comprising:
   four energy units with a substantially same voltage value, wherein each energy unit is provided with a positive electrode and a negative electrode; and
   a socket including eight independently arranged electrode terminals, comprising:
      four positive terminals respectively connected with positive electrodes of the four energy units, and
      four negative terminals respectively connected with negative electrodes of the four energy units, wherein the eight electrode terminals are evenly distributed into an upper row and a lower row,
         the four electrode terminals in the upper row are sequentially a fourth negative terminal, a second negative terminal, a third positive terminal, and a first positive terminal, and
         the four electrode terminals in the lower row are sequentially a first negative terminal, a third negative terminal, a second positive terminal, and a fourth positive terminal.

2. The electric energy storage device according to claim 1, wherein
   each electrode terminal is provided with a contact part formed by two arc-shaped elastic arms, and
   the socket comprises a communication terminal and a charging terminal.

3. The electric energy storage device according to claim 2, wherein
   polarities of two electrode terminals corresponding to the upper row and the lower row are the same, and
   corresponding contact parts of two electrode terminals are vertically aligned.

4. The electric energy storage device according to claim 3, wherein the four electrode terminals on two outer sides are correspondingly connected with the positive electrodes and the negative electrodes of the two energy units respectively, and the four electrode terminals on inner sides are correspondingly connected with the positive electrodes and the negative electrodes of the other two energy units respectively.

5. An electric energy storage device comprising:

four energy units with a substantially same voltage value, wherein each energy unit is provided with a positive electrode and a negative electrode; and a socket including eight independently arranged electrode terminals, comprising:
  four positive terminals respectively connected with positive electrodes of the four energy units, and
  four negative terminals respectively connected with negative electrodes of the four energy units,
  wherein the eight electrode terminals are arranged in a row and sequentially comprise a fourth negative terminal, a third negative terminal, a second negative terminal, a first negative terminal, a second positive terminal, a third positive terminal, a fourth positive terminal, and a first positive terminal.

6. An electric tool system, comprising, an electric energy storage device having:
  four energy units with a substantially same voltage value, wherein each energy unit is provided with a positive electrode and a negative electrode; and
  a socket including eight independently arranged electrode terminals, comprising:
    four positive terminals respectively connected with positive electrodes of the four energy units, and
    four negative terminals respectively connected with negative electrodes of the four energy units; and an electric tool, wherein
  the electric tool is provided with a plug matched with the socket,
  the plug is provided with a plurality of male terminals,
  the plurality of male terminals are electrically connected with the eight electrode terminals respectively, and
  the four energy units form one of the following four connection states:
    a: the four energy units are connected in parallel,
    b: each two of the four energy units are parallel connected first and then series connected therebetween,
    c. each two of the four energy units are series connected first and then parallel connected therebetween, and
    d: the four energy units are connected in series.

7. The electric tool system according to claim 6, wherein the plug comprises a first male blade and a second male blade, the first male blade is connected with four negative terminals of the four energy units, and the second male blade is connected with four positive terminals of the four energy units.

8. The electric tool system according to claim 7, wherein the first male blade and the second male blade are respectively provided with two contact arms, and each contact arm is in contact with two electrode terminals; or the first male blade and the second male blade are respectively provided with four contact arms; each of the contact arms is in contact with one of the electrode terminals.

9. The electric tool system according to claim 6, wherein the plug comprises a first male blade, a second male blade, and a third male blade, wherein the first male blade is connected with two negative terminals corresponding to two energy units, the second male blade is connected with two positive terminals corresponding to the other two energy units, and the third male blade is connected with the remaining four electrode terminals.

10. The electric tool system according to claim 9, wherein the first male blade and the second male blade are respectively provided with two contact arms, and the third male blade is provided with four contact arms.

11. The electric tool system according to claim 10, wherein the four contact arms of the third male blade are located in a row.

12. The electric tool system according to claim 6, wherein the plug comprises a first male blade, a second male blade, a third male blade, a fourth male blade, and a fifth male blade, wherein the first male blade is connected with a negative terminal corresponding to one energy unit, the fifth male blade is connected with a positive terminal corresponding to the other energy unit, and the second male blade, the third male blade, and the fourth male blade are connected with the remaining six electrode terminals in series.

13. The electric tool system according to claim 12, wherein the first male blade and the fifth male blade are respectively provided with one contact arm, and the second male blade, the third male blade, and the fourth male blade each is provided with two contact arms respectively connected to different electrodes.

14. An electric tool system, comprising:

a low-voltage electric tool provided with a low-voltage plug and configured to operate in a low voltage;

a medium-voltage electric tool provided with a medium-voltage plug and configured to operate in a medium voltage;

a high-voltage electric tool provided with a high-voltage plug and configured to operate in a high voltage; and an electric energy storage device, comprising:
  four energy units with a substantially same voltage value, each energy unit provided with a positive electrode and a negative electrode; and
  a socket including eight independently arranged electrode terminals, comprising:
    four positive terminals respectively connected with positive electrodes of the four energy units, and
    four negative terminals respectively connected with negative electrodes of the four energy units;

wherein when the low-voltage electric tool is coupled to the electric energy storage device, the low-voltage plug cooperates with the socket, the four energy units are parallel connected;

when the medium-voltage electric tool is coupled to the electric energy storage device, the medium-voltage plug cooperates with the socket, each two of the four energy units are parallel connected first and then series connected therebetween or each two of the four energy units are series connected first and then parallel connected; and when the high-voltage electric tool is coupled to the electric energy storage device, the high-voltage plug cooperates with the socket, the four energy units are series connected.

\* \* \* \* \*